May 3, 1960    G. JANSEN    2,935,299
CLAMP NUT APPARATUS
Filed Dec. 30, 1957

INVENTOR
GERHART JANSEN
BY M. Ralph Shaffer
HIS ATTORNEY

United States Patent Office 2,935,299
Patented May 3, 1960

2,935,299

CLAMP NUT APPARATUS

Gerhart Jansen, Salt Lake City, Utah

Application December 30, 1957, Serial No. 706,080

4 Claims. (Cl. 254—29)

This invention relates to clamping apparatus for fixedly clamping bolts, studs, shafts, wire and so forth and, in particular, is useful for securing equipment to a mounting plate, baffle or bulkhead where the equipment is provided with mounting bolts or studs, for example, be they threaded or unthreaded.

The present invention utilizes in its design a plurality of gripping jaws, each generally taking the form of a wedge-shaped element having an interior surface which is cylindrically concave and serrated and an exterior surface resembling the surface of a truncated cone segment. These gripping jaws serve to bite into a bolt, for example, disposed therebetween when the jaws are forced into a tapered socket end of an externally threaded, cylindrical carrier by means of a cap, threaded onto the carrier, supplying thrust thereto.

The employment of such apparatus, alone, to accomplish the clamping function is not new, as is evidenced by the Patent No. 674,244, granted to H. McGeorge. The present invention is believed to improve on this basic design, however, by adding thereto a C configured spring which circumferentially holds in place a pre-selected number of jaw elements. Accordingly, the apparatus is suitable to accommodate the gripping of bolts and shafts of various diameters. The greater the diameter of the shaft, the greater the number of jaw elements should be employed, so as to prevent off-centering of the shaft. Heretofore, such off-centering has presented serious difficulties incurred in the operation of conventional clamping devices.

The present invention also adds a compression spring between the conventional cap and the gripping jaws. The purposes for the inclusion of the compression spring are as follows: (1) a wider range of thrust forces may be exerted upon the jaws; (2) the cap will not tend to loosen or "back-off" with spring employment, as would be the case where the cap itself urges the jaw element into the carrier socket; and, most important, (3) the cap may be turned all the way down on the cylindrical carrier so as to butt against the baffle or support plate associated with the shaft and thereby apply a tension force to the shaft itself.

In an additional embodiment of the present invention, a sleeve end nut may be supplied the cylindrical carrier to accomplish purpose or function number 3, (see above). In such event, wrench flats may be disposed medially on the exterior surface of the cylindrical carrier.

Accordingly, an object of the present invention is to provide new and improved clamping apparatus.

A further object of the present invention is to provide new and improved clamping apparatus for securing bolts, studs, shafts and so forth, and for applying tension forces to the same so as to retain the equipment with which they are associated to mounting plates, baffles and so forth.

A further object of the present invention is to provide new and improved clamping apparatus the design of which permits the accommodation of bolts, studs and shafts of a variety of diameters, be they threaded or unthreaded, and which may be used for all purposes for which conventional nuts are used.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
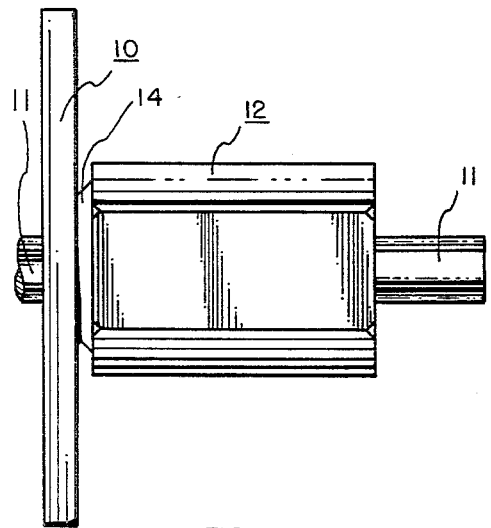
Figure 1 is an elevation of one form of the present invention.
Figure 2:
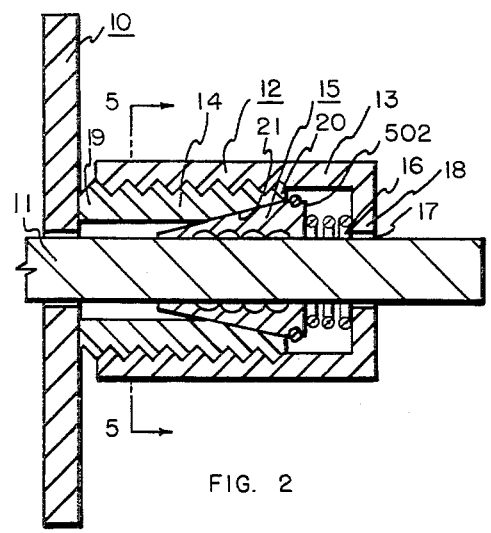
Figure 2 is a vertical section of the apparatus of Figure 1.

In Figures 1 and 2 external member 10 represents a bulkhead, mounting plate or the like. Passing through external member 10 is an additional external member 11, which may be comprised of a shaft, stud, bolt or the like. Let it be assumed that it is desired for member 11 to be clamped by clamp nut apparatus 12, the same to apply a tension force to member 11. Clamp nut apparatus 12 includes an internally threaded cap 13, and externally threaded tubular carrier 14, gripping means 15, and compression spring 16. As is seen with reference to Figure 2, external member 11 passes through an aperture 17 provided in the base 18 of cap 13. Cap 13 itself is threaded onto carrier 14. Carrier 14 has first and second end portions 19 and 20, the latter being provided with an interior socket 21. Jaw means 15 is externally tapered and cooperates with socket 21 so as to bite into external member 11 when thrust is supplied by cap 13 via compression spring 16.

Figure 5:
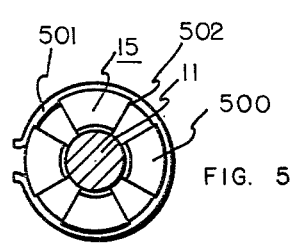
Figure 5 is a vertical section taken along the line 5—5 in Figure 2, showing with particularity the jaw gripping means employed by the present invention in both embodiments thereof.

The jaw gripping means 15 is indicated with particularity in Figure 5. As before mentioned, Figure 5 is a view, partly in cross-section, taken along the line 5—5 in Figure 2, but not showing either cylindrical carrier 14 or cap 13, for purposes of clarity. In Figure 5 jaw gripping means 15 comprises a plurality of jaw elements 500 circumferentially contained by a C configured spring 501. Each of the jaw gripping elements 500 preferably is provided with an external tapered surface and an interior serrated surface of general cylindrical configuration. The jaw gripping elements 500 are also provided with an exterior groove 502 (see also Figure 2) to accommodate the seating therewithin of spring 501. Accordingly, by means of C-spring 501, the several jaw gripping elements 500 are held in a predetermined position about external member 11. It is desirable that there be included within jaw gripping means 15 perhaps five or six or even more jaw gripping elements 500. The more in number (and the smaller in size) the jaw gripping elements, the more will the jaw gripping means 15 be adapted for the accommodation of external members 11 of various diameters. For shafts or studs of increased diameter, the number of jaw gripping inserts 500 within the jaw gripping means 15 will be increased. This increase in the number of jaw gripping elements 500 employed will serve to preclude the "off-centering" of the shaft or stud 11. Hence, the versatility of the apparatus is enchanced by this provision for jaw gripping means 15.

Figure 6:
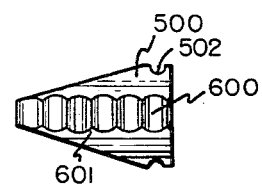
Figure 6 is an elevation view of a representative jaw gripping element employed by the present invention.

Reference to Figure 6 reveals the configuration of each of the several jaw gripping inserts 500. It will be noted that the jaw gripping inserts 500 are provided with a plurality of indentations 600 mutually adjacent ones of which define a plurality of teeth 601. Hence, by their design the several jaw gripping inserts or elements are capable to bite into the shaft 11.

It will be easily understood with reference to Figure 2 that, upon turning or rotating cap 13 over cylindrical carrier 14 in a direction which progresses cap 13 toward member 10, the thrust exerted by compression spring 16 upon the jaw means 15 will be increased, thus increasing the bite of jaw means 15 upon member 11. If the rotation of cap 13 is continued so that its forward end comes in contact with the associated face of member 10, then, upon continuing the rotation of cap 13 relative to cylindrical carrier 14, a force of tension will be exerted upon member 11. This is because of the fact that the cylindrical carrier 14 will tend to back away from the forward surface of external member 10 on the continued rotation of cap 13.

Figure 3:
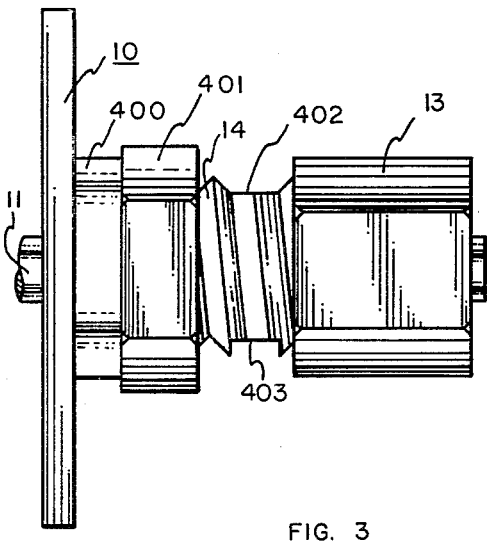
Figure 3 is an elevation of a second embodiment of the present invention, showing the incorporation of a sleeve member and sleeve actuating nut thereby.
Figure 4:
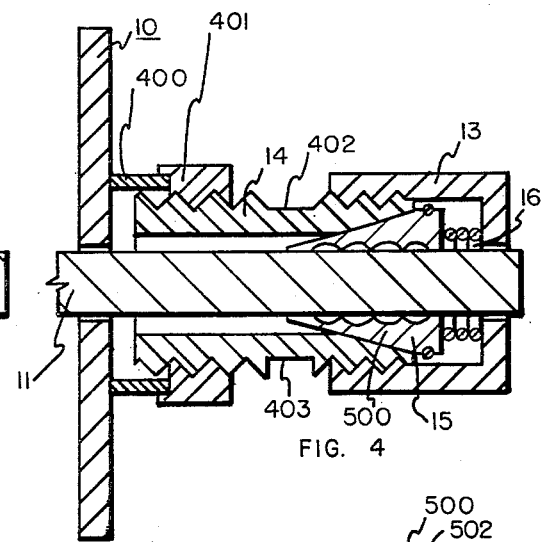
Figure 4 is a vertical section of the apparatus shown in Figure 3.

This force of tension above referred to may be produced by other means, as is evident with reference to a second embodiment of the invention as shown in Figures 3 and 4. The apparatus of Figures 3 and 4 is substantially identical with that of Figures 1 and 2, save for the addition of sleeve member 400 and nut 401. In addition, for the embodiment shown in Figures 3 and 4 the carrier 14 is supplied wrench flats 402 and 403, disposed on opposite sides thereof at some medial point. In the apparatus shown in Figure 4, the cap 13 is turned down on cylindrical carrier 14, thereby increasing the thrust (via compression spring 16) upon jaw means 15. This operation accomplishes the fixed retention or clamping of external member 11. The force of tension is next applied external member 11 by means of applying thrust (via recessed nut 401) to sleeve member 400. This tension applied to external member 11 may be increased to a substantial degree, by the employment of two wrenches disposed upon nut 401 and wrench flats 402 and 403, respectively, without disturbing but in fact increasing the bite into and retention of external member 11 by jaw gripping means 15.

While it need not be so, yet it is believed desirable that nut 401 be provided with a recessed area on the forward surface thereof so as to accommodate the placement therewithin of sleeve 400.

While it is true that for most purposes the carrier 14, sleeve member 400, nut 401, and cap 13 may be manufactured from a material such as brass, for example, yet it is highly desirable that the gripping jaws 500 be fabricated from a hardened tool steel.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. Clamp nut apparatus including, in combination, an externally threaded tubular carrier having first and second end portions, said second end portion being provided with an interior, tapered socket; externally tapered jaw means, for engaging an external elongate member, disposed interiorly of and cooperatively associated with said tapered socket; an internally threaded cap threaded onto said second end portion of said tubular carrier for advancement toward said jaws means; a compression spring cooperatively disposed between said jaw means and said cap; a sleeve member disposed about said first end portion of said threaded tubular carrier; and nut means threaded upon said threaded tubular carrier for advancing said sleeve member in a direction away from said second end portion of said carrier to butt against an additional external member through which said elongate member protrudes, thereby supplying thrust to said elongate member.

2. Apparatus according to claim 1 in which said nut means comprises a nut provided with a sleeve receiving recessed area adapted to cooperate with said sleeve member.

3. Clamp nut apparatus including, in combination, an externally threaded tubular carrier having first and second end portions, said second end portion being provided with an interior, tapered socket; externally tapered jaw means, for engaging an external elongate member, disposed interiorly of and cooperatively associated with said tapered socket; an internally threaded cap threaded onto said second end portion of said tubular carrier for advancement toward said jaw means; a sleeve member disposed about said first end portion of said threaded tubular carrier; and a nut threaded onto said threaded tubular carrier for advancing said sleeve member in a direction away from said second end portion of said carrier to butt against an additional external member from which the previously mentioned external member protrudes, said nut being provided with a sleeve receiving recessed area adapted to cooperate with said sleeve member.

4. Clamp nut apparatus including, in combination, an externally threaded tubular carrier having first and second end portions, said second end portion being provided with an interior, tapered socket; externally tapered jaw means, for engaging an external elongate member, disposed interiorly of and cooperatively associated with said tapered socket; an internally threaded cap threaded onto said second end portion of said tubular carrier for advancement toward said jaw means; a compression spring cooperatively disposed between said jaw means and said cap; a sleeve member disposed about said first end portion of said threaded tubular carrier; and nut means threaded upon said threaded tubular carrier for advancing said sleeve member in a direction away from said second end portion of said carrier, said threaded tubular carrier being provided with medially disposed wrench flats recessed therewithin.

References Cited in the file of this patent

UNITED STATES PATENTS

| | | |
|---|---|---|
| Re. 22,810 | Miller | Nov. 5, 1946 |
| 674,244 | McGeorge | May 14, 1901 |
| 2,138,913 | Fotsch | Dec. 6, 1938 |
| 2,285,690 | Veit | June 9, 1942 |
| 2,817,535 | Linzell | Dec. 24, 1957 |